(No Model.)

G. LOVICK.
SEED PLANTER.

No. 335,370. Patented Feb. 2, 1886.

WITNESSES:
W. W. Hollingsworth
John C. Kemon

INVENTOR:
Geo. Lovick
BY Munn & Co.
ATTORNEYS.

UNITED STATES PATENT OFFICE.

GEORGE LOVICK, OF TEMPLE, TEXAS.

SEED-PLANTER.

SPECIFICATION forming part of Letters Patent No. 335,370, dated February 2, 1886.

Application filed May 26, 1885. Serial No. 166,800. (No model.)

*To all whom it may concern:*

Be it known that I, GEORGE LOVICK, a citizen of the United States, residing at Temple, in the county of Bell and State of Texas, have invented certain new and useful Improvements in Seed-Planters, of which the following is a description.

Figure 1:
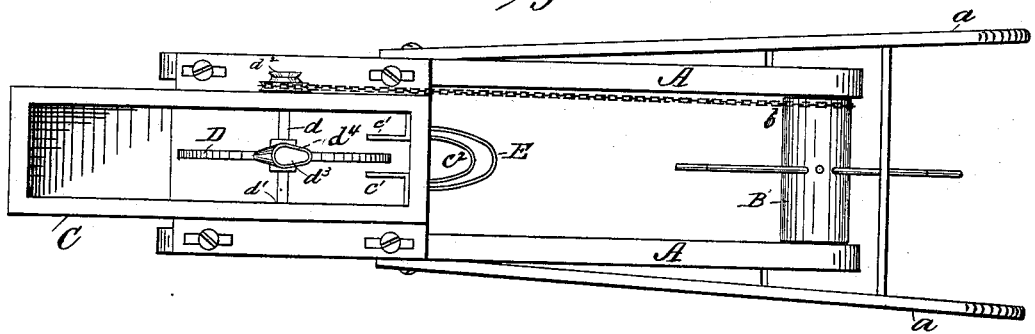
Figure 2:
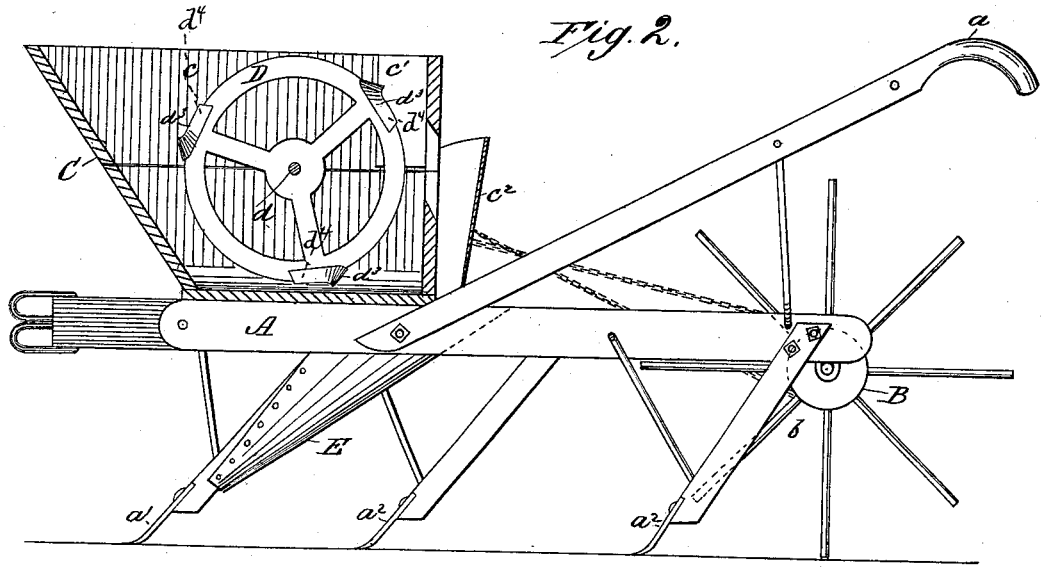

Figure 1 is a plan view of the seed-planter, looking downward from above. Fig. 2 is a side view of the same, with the hopper shown in section on the line $x\ x$ in Fig. 1.

This invention relates to seed-planters; and it consists in the detailed construction of the parts hereinafter described, by which the operator is enabled to see each seed in its passage from the planting-wheel to the ground, and so can guard against the disadvantage of some of the rows being only half planted, from the seed-spout getting stopped up, or from the planter-wheel failing to act properly, and in other improvements, as will be explained.

In the accompanying drawings similar letters of reference indicate corresponding parts in all the figures.

A is the frame-work of the planter, provided with handles $a$, for guiding it, the blade $a'$, for opening a furrow for the reception of the seed, and the blades $a^2$, for closing the said furrow after the seed has been planted in it.

B is a wheel journaled in the framing of the planter, and provided with a pulley, $b$, over which passes a chain for revolving the planter-wheel.

C is a hopper mounted upon the frame-work of the planter and made in two portions, of which the upper, $c$, is provided with guide-plates $c'$, for regulating the feed of the planter-wheel. The lower part of hopper C is made rounded at the bottom, so as to throw the seed toward the center of it, where the planter-wheel revolves, and is provided with a guard, $c^2$, over the outside of that end of it where the seed is discharged from the planter-wheel to the spout.

D is the planter-wheel, mounted upon the axle $d$ in bearings $d'$, attached to the lower part of the hopper. A pulley, $d^2$, is also mounted on the axle $d$ outside the hopper, and is driven by the chain which passes over the pulley $b$, so that the planter always revolves toward the handles of the planter, where the operator is. The planter-wheel D is provided with buckets or pockets $d^3$ upon its circumference. The seed is raised in these from the bottom of the hopper and discharged over the end of it through the guard $c^2$. Guard-flanges $d^4$ project forward from the mouth of the pockets, on opposite sides thereof. By this construction the seed, when the pockets have passed the crown of the wheel's revolution, are prevented from falling off the sides of wheel, and are held by such flanges and guided into the opening in the back of the seed-box.

E is the spout, attached to the arm which carries the furrow-opening blade $a'$. This spout catches the seed as it falls from the planter-wheel and deposits it in the furrow just behind the blade. The operator can see each seed as it falls from the planter-wheel into the spout, and can therefore guard against irregularity in planting. When cotton-seed is being planted, a suitable cotton-planting wheel, which may be of ordinary construction, may be substituted for the wheel D.

The planter can be speeded to plant seed at any distance apart by changing the sizes of the chain-pulleys by which the planter-wheel is driven; or the number of buckets may be increased or diminished with the same effect.

Having thus described my invention, what I claim as new, and desire to secure by Letters Patent, is—

1. A planter-wheel, as described and shown, having its periphery provided with pockets, and with guard-flanges projected forward from the opposite sides of the mouth of the pockets, substantially as set forth.

2. In a planter, a seed-box having a discharge-opening through its rear side, combined with a wheel journaled therein, and having its periphery provided with pockets arranged to deliver seed through the opening in the box, and having guard-flanges projected forward from the opposite sides of the mouth of the pockets, substantially as set forth.

3. A seed-box having a discharge-opening through its rear side, and provided with guide-plates projected rearwardly from such rear side above and on opposite sides of the said opening, combined with a planter-wheel revolving in said box, and adapted to discharge seed between the guide-plates and through the discharge-opening, substantially as and for the purposes specified.

GEORGE LOVICK.

Witnesses:
S. B. PERRY,
JOHN W. MUNROE.